(12) United States Patent
Hwang

(10) Patent No.: US 8,378,802 B2
(45) Date of Patent: Feb. 19, 2013

(54) EXTERIOR REAR VIEW MIRROR WITH INDICATOR LIGHT

(75) Inventor: Hyok Joo Hwang, Bucheon (KR)

(73) Assignee: SMR Patents S.a.r.l., Luxembourg (LU)

( * ) Notice: Subject to any disclaimer, the term of this patent is extended or adjusted under 35 U.S.C. 154(b) by 579 days.

(21) Appl. No.: 12/535,086

(22) Filed: Aug. 4, 2009

(65) Prior Publication Data

US 2010/0026475 A1 Feb. 4, 2010

(30) Foreign Application Priority Data

Aug. 4, 2008 (EP) ...................................... 08161721

(51) Int. Cl.
*B60Q 1/00* (2006.01)
(52) U.S. Cl. .......................... 340/438; 340/465; 359/265
(58) Field of Classification Search .................. 340/438, 340/465; 359/265, 267, 872
See application file for complete search history.

(56) References Cited

U.S. PATENT DOCUMENTS

| | | | |
|---|---|---|---|
| 5,711,592 A | | 1/1998 | Hotta |
| 7,349,144 B2 * | | 3/2008 | Varaprasad et al. .......... 359/267 |
| 7,626,749 B2 * | | 12/2009 | Baur et al. .................... 359/265 |
| 2004/0262053 A1 | | 12/2004 | Ludewig et al. |
| 2007/0290829 A1 | | 12/2007 | Geiger et al. |

FOREIGN PATENT DOCUMENTS

| | | |
|---|---|---|
| EP | 0443185 | 8/1991 |
| EP | 1652727 | 5/2006 |
| EP | 1914118 | 4/2008 |

OTHER PUBLICATIONS

European Search Report for application No. EP08161721.9 dated Jan. 19, 2009.

* cited by examiner

*Primary Examiner* — John A Tweel, Jr.
(74) *Attorney, Agent, or Firm* — Reising Ethington P.C.

(57) ABSTRACT

The invention describes a rear view mirror including a reflective element in a cavity of a mirror housing with a mirror head and a mirror base. An indicator light for indicating situation information to a vehicle driver is installed, wherein the indicator light includes light sources and an optical element that allows the light to shine through. The indicator light has a split printed circuit board to support at least two light source elements and a light guide wherein the light emitted from the light sources is coupled into the end faces of the light guide.

11 Claims, 6 Drawing Sheets

EXTERIOR REAR VIEW MIRROR WITH INDICATOR LIGHT

FIELD OF THE INVENTION

The present invention relates to exterior rearview mirror and, more particularly, to an exterior rearview mirror having an indicator light.

BACKGROUND OF THE INVENTION

The invention is based on a priority patent application EP08161721.9 which is hereby incorporated by reference.

Driver assistant systems are well known and are implemented more and more in vehicles.

It is known to provide a blind spot detection/Lane Change Assist (LCA) system for a vehicle that detects the presence of another vehicle or object in the lane next to the host vehicle, where it may be difficult for the driver of the host vehicle to determine whether or not there is another vehicle or object adjacent to the host vehicle. Such a blind spot detection/LCA system often includes a visual indicator that visually indicates to the driver that another vehicle or object has been detected. The visual indicator (commonly a light emitting diode or the like) is often located at the reflective mirror element of the exterior rearview mirror assembly and external of the vehicle cabin, or may be located interior to the vehicle, such as at the A-pillar of the vehicle within the interior of the vehicle cabin (such as on MY 2005 Volvo vehicle models equipped with camera-based BLIS systems). The visual blind spot/LCA indicators indicate or alert the driver of the host vehicle the presence or impending presence of another vehicle in a blind spot in an adjacent side lane that typically cannot be readily seen within the field of view of the exterior mirror reflective element of the exterior mirror assembly mounted at that side of the vehicle, and/or cannot be readily seen by the driver's peripheral vision or the like. The visual blind spot/LCA indicators typically must be viewable principally or solely by the driver of the host vehicle and not by drivers of other vehicles. If the indicator is located external to the vehicle cabin, and especially since it is now common to use turn signals on exterior mirrors, any visibility of the indicator to the driver of another vehicle (such as a trailing vehicle or an overtaking vehicle) may cause confusion to the driver of the other vehicle as to whether or not the indicator is a turn signal indicator or some other vehicle lighting or the like. This may be particularly problematic when the visual blind spot/LCA indicator is located behind (and often supported by) the reflective mirror element of the vehicle exterior mirror assembly, and may be especially confusing if other indicators are also disposed behind/supported by the mirror reflective element, such as turn signal indicators. For example, somewhat costly and complicated visual blind spot/LCA indicator constructions have been contemplated that, when placed behind and supported by the mirror reflective element, attempt to have their projected beam of emitted light shielded from view by other drivers and attempt to be directed principally to be viewed by the driver of the host vehicle. This can be further complicated by the fact that the mirror reflective element (and hence any visual blind spot/LCA indicator supported thereon/there behind) is adjustable via a mirror actuator.

Thus, prior art visual blind spot/LCA indicators are often supported by and to the rear of the movable mirror reflective element, so as to be viewable by a driver of the host vehicle through the reflective element of the mirror assembly. For example, a transmissive window may be formed in the reflective coating or coatings of the reflective element and an illumination source or indicator may be positioned so as to direct or emit illumination through the window and toward the driver of the host vehicle so as to be viewable by the driver of the host vehicle.

Therefore, there is a need in the art for an improved visual blind spot/LCA indicator that is readily viewable by a driver of the host vehicle and not visible or viewable by a driver of another vehicle. In the EP 1652727 an indicator at the rear view mirror is used, wherein the indicator light is adapted to avoid distortion of the driver. For this purpose a special optic with Fresnel lenses is used to adapt power of the light to the different views of drivers in different seat positions.

The EP 0443185 B1 shows a indicator system positioned at the base of the vehicle with a couple of LEDs to indicate dangerous situation with different colors.

The intention of the invention is to provide a simple indicator light for mass production which can installed at different positions of a rear view mirror and allows a simple production of the product.

SUMMARY OF THE INVENTION

The present invention provides an indicator light that is fixedly located at the mirror housing or cover and/or at the base of an exterior rearview mirror, so as not to move or adjust when the mirror reflective element is moved or adjusted to set its field of view. Preferably, the indicator is fixedly located at the inboard wall or portion of the mirror shell or casing, so as to be readily viewed by the driver of the host vehicle, while being substantially non-visible or non-viewable by a driver of another vehicle. The indicator is preferably located at an outwardly extending rearward portion of the mirror assembly that is angled so as to slope or extend at an angle away from the body side of the vehicle, so that indicator is generally facing the driver of the host vehicle and is readily viewable by the driver of the host vehicle and substantially non-visible or non-viewable by a driver of another vehicle at or approaching the host vehicle.

According to an aspect of the present invention, an exterior rearview mirror for a vehicle includes a reflective element, mirror housing and an indicator. The indicator is located at and oriented at the inboard portion of the mirror housing so as to be viewable by the driver of the vehicle and so as to be substantially to totally non-viewable by the drivers of other vehicular traffic, such as other vehicular traffic rearward of, sideward of, approaching, overtaking, forward of or otherwise at or near the host vehicle.

The inboard portion of the mirror housing (which at least in part defines a cavity within which the mirror reflective element is disposed and within which the mirror reflective element is adjustable) may comprise an inboard bezel of the mirror housing. Typically, the exterior mirror comprises a base of the mirror that extends from the side of the vehicle to where the mirror housing is disposed.

The indicator may include a light source such as one or more light emitting diodes LEDs or the like, and may include a lens or other optic and a light directing/guiding device or element. A light directing element, preferably at the mirror housing, is substantially disposed therein so as not to overly protrude to create aerodynamic drag and so as to provide an aesthetically pleasing exterior appearance and for directing the light emitted by the light source toward the driver for viewing by the driver of the host vehicle and, if required, for limiting or restricting viewing by drivers of other vehicles.

The present invention provides a two part module as indicator that is easy to implement in an adequate position in or at the rear view mirror. The design of the indicator is such that the mirror housing can be produced with the optical part and the light source in a subassembly can be installed separately.

These and other objects, advantages, purposes and features of the present invention will become apparent upon review of the following specification in conjunction with the drawings.

DETAILED DESCRIPTION OF THE DRAWINGS

Figure 1:
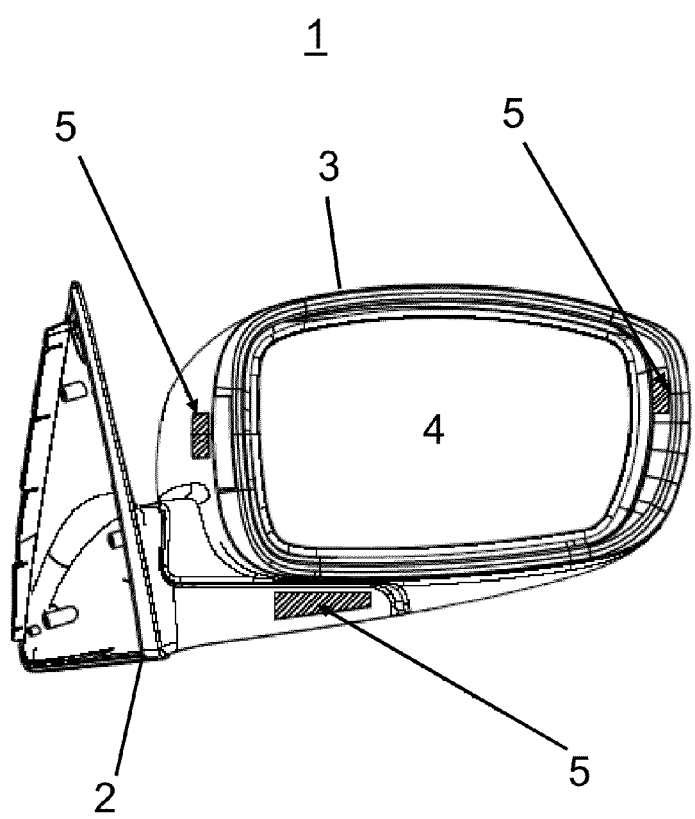
FIG. 1 shows examples of positions of indicator light at a rear view mirror.

FIG. 1 shows a representative rear view mirror 1 with a mirror head 3 and a mirror base 2. The mirror head comprises a cavity in which a reflective element 4, the mirror glass is installed. The rear view mirror is designed to comprise all devices a person skilled in art would add to, for example: an actuator, a turn signal light, a security light to illuminate the ground adjacent to the vehicle, a power fold actuator etc.

The indicator light 5 is installed at different positions. The position as such is not important. The indicator light must be visible for the vehicle's driver and must not disturb other traffic members. The idea is that in a situation in which a vehicle is approaching the indicator light glows up and driver is motivated to have a look over the shoulder.

Indicator light could be also used for other dangerous situations in driving. As an approach signal, if the distance between the vehicle and the vehicle travelling in the same direction in front is too close or if distance between vehicle and a parking vehicle at the side is too close.

The indicator light 5 can be in one embodiment integrated into another light function as a turn signal light or a security light or a positioning light.

Figure 2:
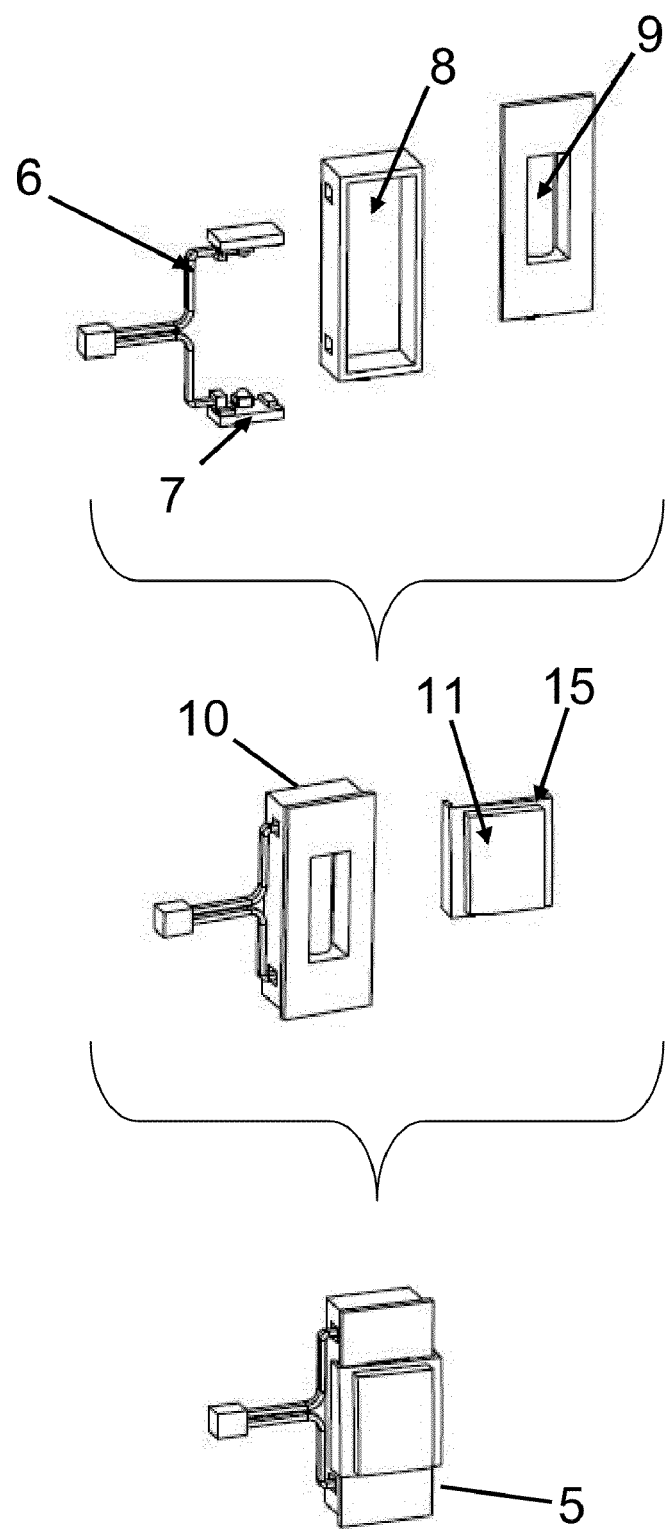
FIG. 2 shows a first embodiment of a indicator light.
Figure 3:
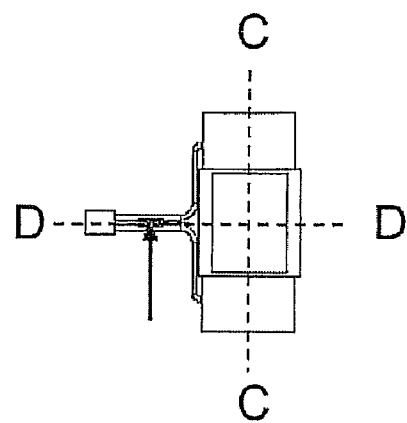
FIG. 3 shows an indicator light.
Figure 4:
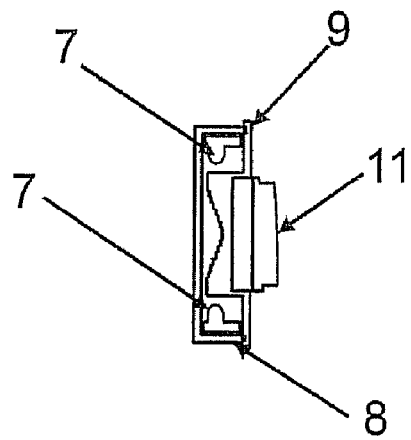
FIG. 4 shows a cross section C-C.

FIG. 2 shows a structure for the indicator light device. A printed circuit board 6 is designed in a way that it is split to support the light sources 7. In this example the printed circuit board is split into two parts. The printed circuit board 6 is installed in a body structure 8 which is a frame for the printed circuit. A light guide device 9 covers the body 8. This indicator subassembly is put into the rear view mirror. An outer lens 11 covers the opening of the light guide 9 and allows the light of the LEDs to emit through the rear view mirror. The outer lens 11 is part of the mirror housing 12 and the indicator light subassembly 10 is pressed into the rims of the outer lens to be snap connected.

Figure 5:
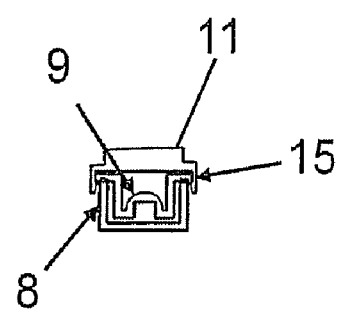
FIG. 5 shows a cross section D-D.
Figure 6:
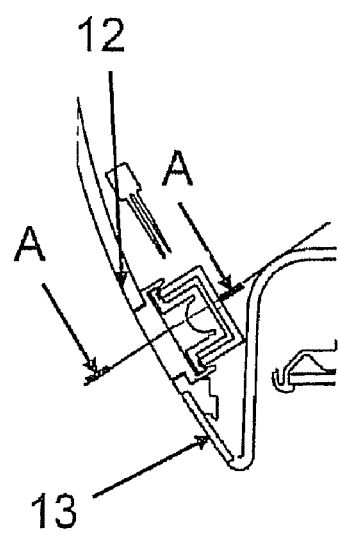
FIG. 6 shows a cross section D-D with the rear view mirror.
Figure 7:
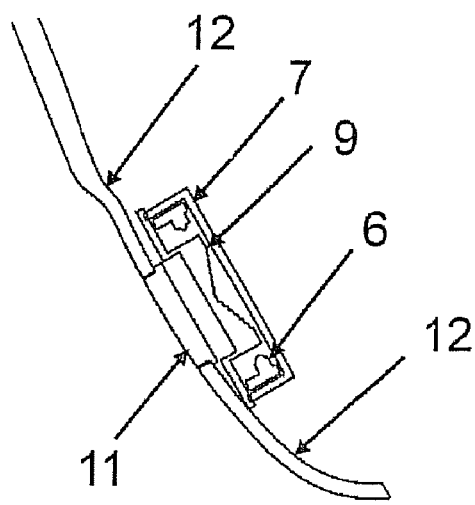
FIG. 7 shows a cross section C-C with the rear view mirror.

FIGS. 3 through 7 shows the indicator light installed in the rear view mirror. In FIG. 5, the indicator light is visible as a complete device as it is installed at the rear view mirror. The cross section in FIG. 4 and more in FIG. 5 discloses the rim 15 in which the subassembly 10 is pressed. In FIG. 6 the installation is shown. The subassembly 10 is pressed versus the outer lens 11 which is fixed in the mirror housing 12 especially in the housing cover. The outer lens 11 is fixed smoothly in the contour of the mirror housing 12. And the subassembly 10 is fixed to this outer lens 11 by clips into the rim structure of the outer lens 11. Snap connection allows the easy installation of subassembly 10.

Figure 8:
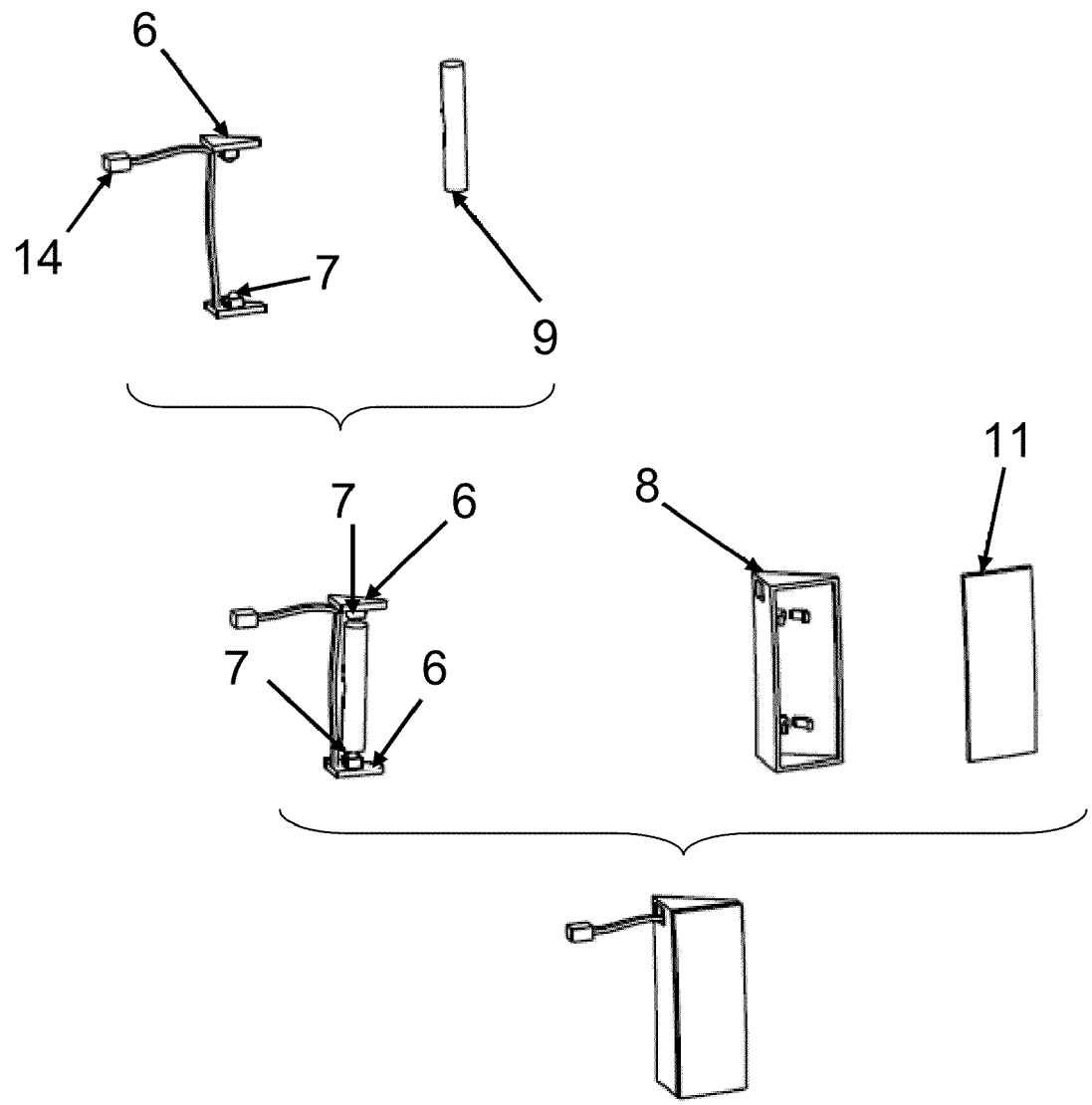
FIG. 8 shows an embodiment of the indication light.

FIG. 8 shows another embodiment of the invention. The printed circuit board 6 is split into two parts connected to a single connector 14. The light guide 9 has the form of a cylindrical rod and is installed between the two parts of the printed circuit board and the light sources 7. A body 8 hosts the printed circuit—light guide combination. Also, the body 8 has a small hole at the other side so that a wire connected to the printed circuit board 6 can be extended out of the inner side of the body 8. An LED is placed on each side of the printed circuit board 6 and a resistor and diode are placed on the one of the two split parts of the printed circuit board 6. The two part of the split printed circuit board 6 are connected by the wire so that the current flow is maintained. One of the two parts of the printed circuit board 6 is connected to the control module of the blind spot detection system mounted into vehicle so that power is supplied. An outer lens 11 covers the body 8. The outer lens 11 includes a rim structure that is used to clip the subassembly into the outer lens 11.

The outer lens 11 is installed on top of the light pipe. The outer lens 11 has a great variety of shapes because every mirror differs from external shape of its mirror housing or according to the place to which the indicator is installed in the identical mirror.

Figure 9:
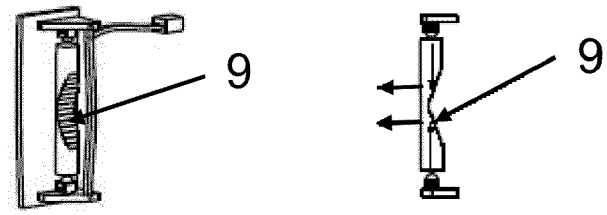
FIG. 9 shows another embodiment of the indication light.

As shown in FIG. 9 the light guide 9 is in one embodiment structured. The light guide shows riffles that allow light to couple out. The light guide has an indentation for a better out-coupling of light.

Figure 10:
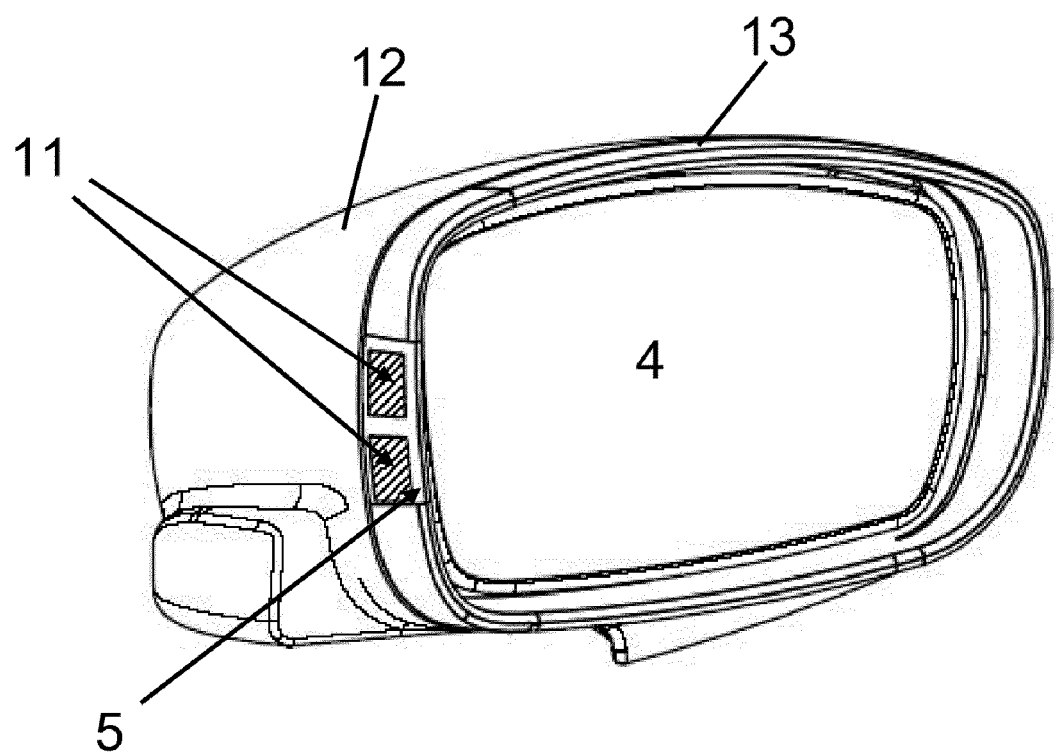
FIG. 10 shows another embodiment of an indication light in a rear view mirror.
Figure 11:
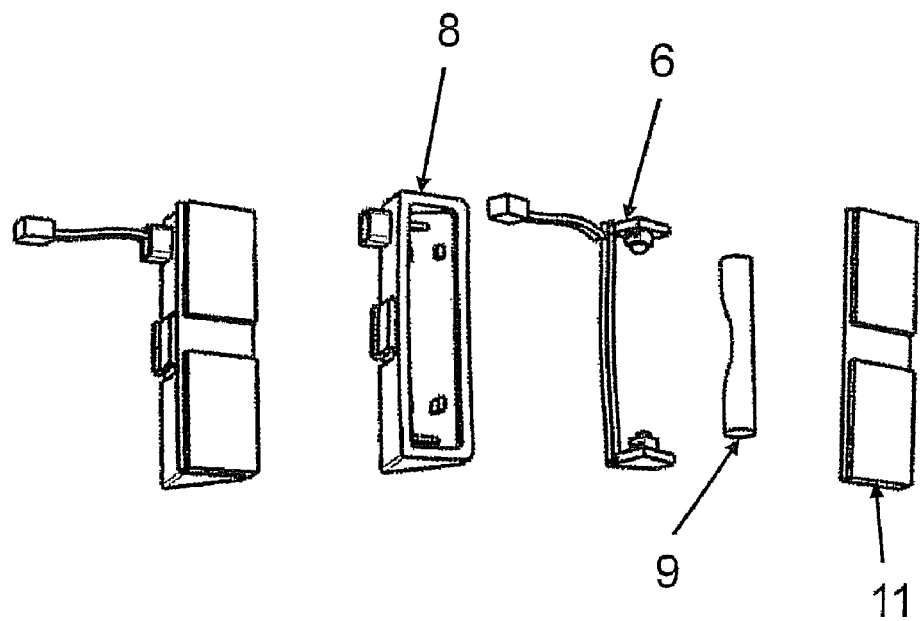
FIG. 11 shows details of the embodiment of FIG. 10.

FIG. 10 shows a rear view mirror with a mirror housing 12 a housing cover 13 and an indicator light. In this embodiment the outer lens 11 is structured to appear as a two part lens. In FIG. 11, this solution is described with an outer lens 11 that is structures to appear with two parts in the mirror housing 12.

The mirror housing in which the outer lens 11 is integrated can be produced in several ways. A common solution will produce the mirror housing 12 in a plastic mold injection process with a opening to install the outer lens 11. The installation can be done by gluing, welding and other methods person skilled in art will use.

Another production method will produce the mirror housing 12 in a two component injection mold process as described in EP 1914118 A1. A part of a housing of the mirror head and/or a housing of a mirror base includes two plastic films that have different light permeabilities. The plastic film with smaller light permeability is not provided within the translucent area, such that the light radiated from the lighting unit is radiated outwards with sufficient luminous intensity.

The invention is not limited to the embodiments described.

REFERENCES

Rear View Mirror 1
Base 2
Mirror Head 3
Reflective Element 4
Indication Light 5
Printed Circuit 6
LED 7
Body 8
Light guide 9
Indicator subassembly 10
Outer Lens 11
Mirror housing 12
Housing Cover 13
Conductor 14

The invention claimed is:

1. A rear view mirror for a motor vehicle driven by a vehicle driver, said rear view mirror including a reflective element in a cavity of a mirror housing with a mirror head and a mirror base, and an indicator light for indicating dangerous situation information to the vehicle driver, wherein the indicator light includes light sources and an optical element that allows the light to shine through, characterized in that the indicator light has split printed circuit board to support at least two light source elements and a light guide wherein the light emitted from the light sources is coupled into the end faces of the light guide and directed toward the vehicle driver and away from occupants of other vehicles.

2. A rear view mirror according claim 1 characterized in that the optical element is part of the mirror housing.

3. A rear view mirror according claim 1 characterized in that the optical element has a rim structure to attach the indicator light subassembly comprising split printed circuit board, at least two light source elements and a light guide.

4. A rear view mirror according claim 3 characterized in that the subassembly is snap connected to the mirror housing with optical element.

5. A rear view mirror according claim 1 characterized in that the light guide has more than two end faces.

6. A rear view mirror according claim 1 characterized in that the light guide has a structure in the surface to allow light to be coupled out.

7. A rear view mirror according claim 1 characterized in that the optical element is a lens which is inserted into the mirror housing material by welding.

8. A rear view mirror according claim 1 characterized in that the optical element is a lens which is inserted into the mirror housing material by gluing.

9. A rear view mirror according claim 1 characterized in that the optical element is a lens which is inserted into the mirror housing material by two component plastic molding process.

10. A rear view mirror according claim 1 characterized in that the optical element is structured to appear as multiple lens on the surface of the rear view mirror housing.

11. A rear view mirror according claim 1 characterized in that the indicator subassembly is combined to another illumination device.

* * * * *